UNITED STATES PATENT OFFICE.

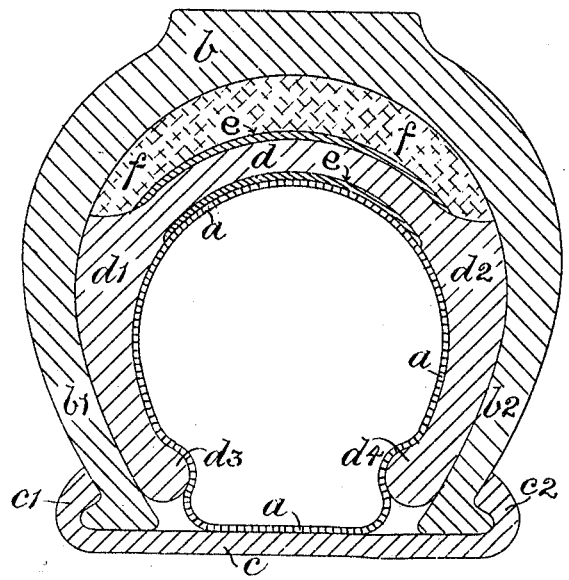

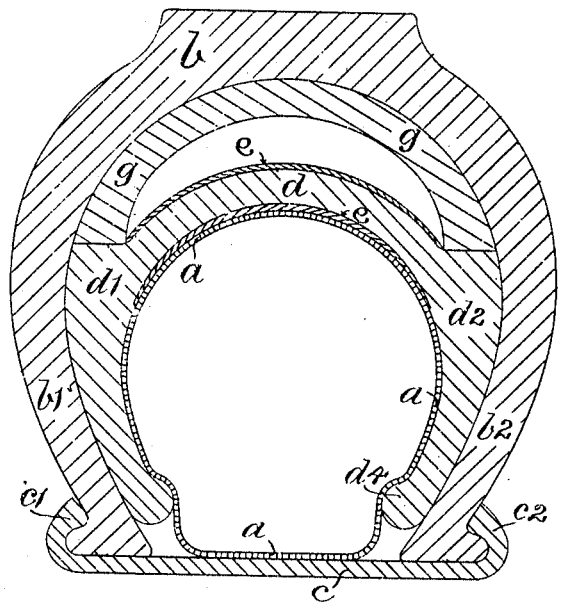

JOHN CHARLES BARKER, OF LEEDS, ENGLAND.

PNEUMATIC TIRE.

1,004,343.  Specification of Letters Patent.  Patented Sept. 26, 1911.

Application filed May 7, 1910. Serial No. 559,888.

*To all whom it may concern:*

Be it known that I, JOHN CHARLES BARKER, a subject of the King of Great Britain and Ireland, residing at Leeds, in the county of York, England, have invented certain new and useful Improvements in Pneumatic Tires; and I do hereby declare the following to be a full, clear, and exact description of the invention, such as will enable others skilled in the art to which it appertains to make and use the same.

This invention relates to pneumatic tires, more especially such as are intended for use in connection with motor cars.

The object of the invention is to avoid certain disadvantages attaching to the usual type of pneumatic tire. When these are blown up hard as is usual at the present time, the vibrations set up in the tire and wheel are not so readily or completely absorbed as was previously the case, when the pressure to which the tire was blown up was considerably less. Also the tread portion of the tire or outer cover being tightly stretched by such high pressures of compressed air is very much more liable to damage by cutting and puncture than when under a low pressure. Now this invention obviates or greatly lessens these disadvantages by inserting a separate internal lining which is inextensible in its crown part between the inner air tube and the outer cover, so formed as to leave a space between itself and the tread portion of the outer cover, in which a spring or elastic filling is inserted to hold the outer cover normally distended to its ordinary shape, while allowing a suitable deflection under the load of the car; the inextensible lining taking the full pressure of the compressed air off the tread portion only of the outer cover.

In the accompanying drawings: Figure 1 is a cross section of a pneumatic tire constructed in accordance with this invention, in which the space between the lining and the tread portion of the outer cover is filled with some elastic material. Fig. 2 is a cross section, in which an elastic bridge piece is used in place of the elastic filling.

Referring to Fig. 1, $a$ indicates the inner rubber air tube, $b'$ $b$ $b^2$ the outer cover and $c'$ $c$ $c^2$ the metal rim of the wheel. $d'$ $d$ $d^2$ is the separate internal lining to the outer cover $b'$ $b$ $b^2$, which may be made of rubber, covered on both the inside and outside of the crown, his being the part in proximity to the tread of the tire, by canvas $c$ or other suitable inextensible fabric. This canvas makes the crown of the lining inextensible under the air pressure in the inner tube $a$. Whether the sides of the lining be inextensible matters little if the crown be so. The sides $d'$ $d^2$ of the lining extend within a short distance of the inner edges of the sides $b'$ $b^2$, of the outer cover and are so molded that when the air tube $a$ is inflated the sides $d'$ $d^3$ and $d^2$ $d^4$ fit against the inside of the sides $b'$ $b^2$ respectively of the outer cover, thus gripping the latter tightly and firmly. The crown $d$, recessed as shown in Fig. 1, of the lining is such as to leave a space between it and the periphery or tread part $b$ of the outer cover of a comparatively uniform and considerable depth, since owing to the construction of the crown $d$ of, or with, a practically inextensible material as above described, the crown $d$ cannot, by blowing up the air tube $a$, be pressed out to fill any part of said space. The full pressure of the air within the tube $a$ is therefore not transmitted to the tread $b$ of the outer cover, while the full air pressure is transmitted to the sides $d'$ $d^2$, of the lining, and the sides $b'$ $b^2$ of the outer cover respectively, sufficiently tight to keep the lining in its place within the outer cover, and the inner ends of the sides $b'$ $b^2$ of the latter tightly gripping against the flanges $c'$ $c^2$ of the metal rim of the wheel. The extreme inner edges $d^3$ $d^4$ of the sides of the lining may also be thickened as shown to increase the grip or holding power. The space between the crown $d$ of the lining and the tread $b$ of the outer cover is filled with felt, cork or other soft or elastic material $f$, secured in so as to exert only a moderate pressure on the tread $b$, so that the vibrations in the tire are more or less absorbed by such packing or filling material.

The modification shown in Fig. 2 substitutes a bridge piece for the pad $f$, to hold the outer cover distended. This bridge piece fills the outer part of the recess in the crown of the lining and leaves below it a crescent form open space permitting some play of said bridge piece. The canvas strips of course are used as before.

As the filling in material $f$ or the bridge $g$ exerts only a low pressure on the tread of the outer cover, any vibrations in the tire are at once absorbed. Also it will be evident that the tire is practically puncture proof.

due both to the protecting covering of felt or the arch and to the fact that the tread portion of the outer cover is not tightly stretched.

I am aware that tires having an inner air tube surrounded by strips or covers of canvas or other fabrics and having a padding of cork, felt or the like between the same and the outer cover have been previously used or proposed to be used. I therefore make no claim broadly to such combination, but What I do claim and desire to secure by Letters Patent is:

1. In combination with a wheel-rim and a tire-cover held thereto, an air-tube within said cover, a lining between said cover and air-tube having an inextensible crown which is recessed in proximity to the tread, and an elastic device located in this recess next to the tread and adapted to hold the outer cover distended and to take up the vibrations of the running jars while being guarded by said crown against excessive pressure from the air tube substantially as set forth.

2. In combination with a wheel-rim and a tire cover held thereto, an air-tube within said cover, a lining between said cover and air-tube having an inextensible crown which is recessed in proximity to the tread and an elastic pad located in this recess next to the tread and adapted to hold the outer cover distended and to take up the vibrations of the running jars while being guarded by said crown against excessive pressure from the air-tube substantially as set forth.

In testimony whereof, I have signed my name to this specification in the presence of two subscribing witnesses.

JOHN CHARLES BARKER.

Witnesses:
J. CLARK JEFFERSON,
WILLIAM SESTON EDMONDSON.